United States Patent
Rau et al.

(10) Patent No.: US 12,510,182 B2
(45) Date of Patent: Dec. 30, 2025

(54) SOLENOID VALVE AND HYDROGEN TANK SYSTEM COMPRISING SOLENOID VALVE

(71) Applicant: Robert Bosch GmbH, Stuttgart (DE)

(72) Inventors: Andreas Rau, Stuttgart (DE); Udo Schaich, Stuttgart (DE); Joachim Soubari, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 18/681,910

(22) PCT Filed: Jul. 29, 2022

(86) PCT No.: PCT/EP2022/071345
§ 371 (c)(1),
(2) Date: Feb. 7, 2024

(87) PCT Pub. No.: WO2023/030787
PCT Pub. Date: Mar. 9, 2023

(65) Prior Publication Data
US 2024/0369151 A1    Nov. 7, 2024

(30) Foreign Application Priority Data

Aug. 30, 2021   (DE) .................. 10 2021 209 468.6

(51) Int. Cl.
*F16K 31/06* (2006.01)
*F16K 39/02* (2006.01)
*F17C 13/04* (2006.01)

(52) U.S. Cl.
CPC ........ *F16K 31/0655* (2013.01); *F16K 39/026* (2013.01); *F17C 13/04* (2013.01); *F16K 2200/402* (2021.08); *F17C 2205/0332* (2013.01)

(58) Field of Classification Search
CPC ............... F16K 31/0655; F16K 39/026; F16K 2200/402; F17C 13/04; F17C 2205/0332;
(Continued)

(56) References Cited

U.S. PATENT DOCUMENTS 3,100,103 A * 8/1963 Bullard ................. F16K 31/408
251/38
3,578,284 A * 5/1971 Martini ............... F16K 31/0665
251/30.02
(Continued)

FOREIGN PATENT DOCUMENTS

DE         10030250 A1   8/2001
DE    102018221600 A1   6/2020
(Continued)

OTHER PUBLICATIONS

Translation of International Search Report for Application No. PCT/EP2022/071345 dated Jan. 9, 2023 (2 pages).

*Primary Examiner* — Donnell A Long
(74) *Attorney, Agent, or Firm* — Michael Best & Friedrich LLP

(57) ABSTRACT

The invention relates to a solenoid valve (1), in particular a shut-off valve for hydrogen tank systems, comprising a reciprocatingly movable magnetic armature (2) which is or can be coupled to a reciprocatingly movable valve element (3), the magnetic armature (2) being preloaded in the direction of the valve element (3) by means of a spring (4), the solenoid valve further comprising an annular solenoid coil (5) for acting on the magnetic armature (2), the solenoid coil (5) surrounding the magnetic armature (2) in portions. According to the invention, the magnetic armature (2) has a portion (2.1) designed as a plunger armature and a portion (2.2) designed as a flat armature, the portion (2.1) designed as a plunger armature delimiting a pressure chamber (6) within the solenoid coil (5), which pressure chamber is
(Continued)

connected pneumatically, preferably via a choke (7), to a control chamber (8) which can be relieved by opening a control valve (9) which can also be actuated by means of the solenoid coil (5). The invention also relates to a hydrogen tank system comprising a solenoid valve (1) according to the invention.

18 Claims, 6 Drawing Sheets

(58) Field of Classification Search
CPC ........ F17C 2223/036; F17C 2205/0326; F17C 2205/0382; F17C 2221/012; F17C 2223/0123; F17C 2270/0184; Y02E 60/32
See application file for complete search history.

(56) References Cited

U.S. PATENT DOCUMENTS

| | | | |
|---|---|---|---|
| 3,810,489 A * | 5/1974 | MacManus | F02M 37/0023 137/510 |
| 6,343,621 B1 * | 2/2002 | Holmes | G05D 16/2024 137/625.61 |
| 6,675,831 B2 | 1/2004 | Sakaguchi et al. | |
| 9,423,047 B2 * | 8/2016 | Vogt | F16K 31/0624 |
| 2003/0066836 A1 * | 4/2003 | Sakaguchi | F17C 1/14 220/581 |
| 2014/0239207 A1 | 8/2014 | Ninomiya et al. | |
| 2015/0083949 A1 * | 3/2015 | Vogt | F16K 11/052 251/129.19 |
| 2015/0184805 A1 | 7/2015 | Lee | |
| 2018/0038507 A1 | 2/2018 | Ninomiya et al. | |

FOREIGN PATENT DOCUMENTS

| | | |
|---|---|---|
| DE | 102018221602 A1 | 6/2020 |
| WO | 2014132089 A1 | 9/2014 |
| WO | 2020158728 A1 | 8/2020 |

* cited by examiner

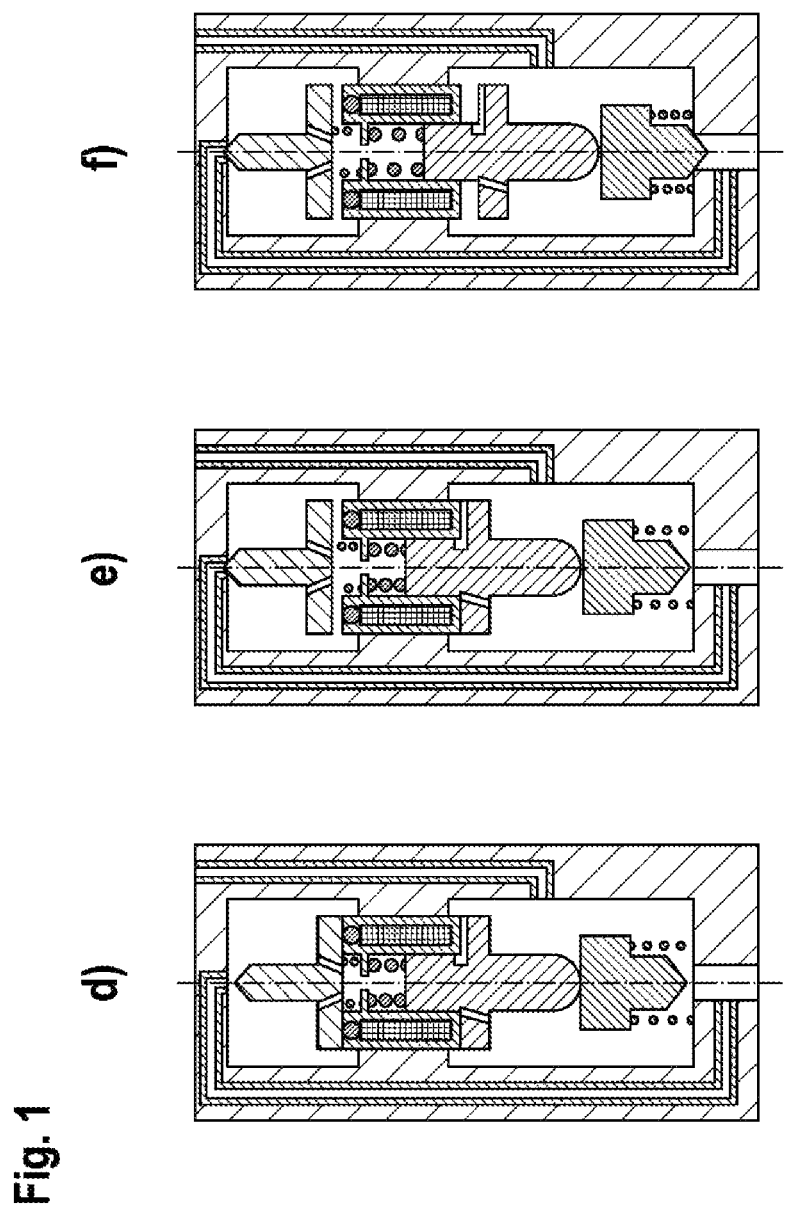

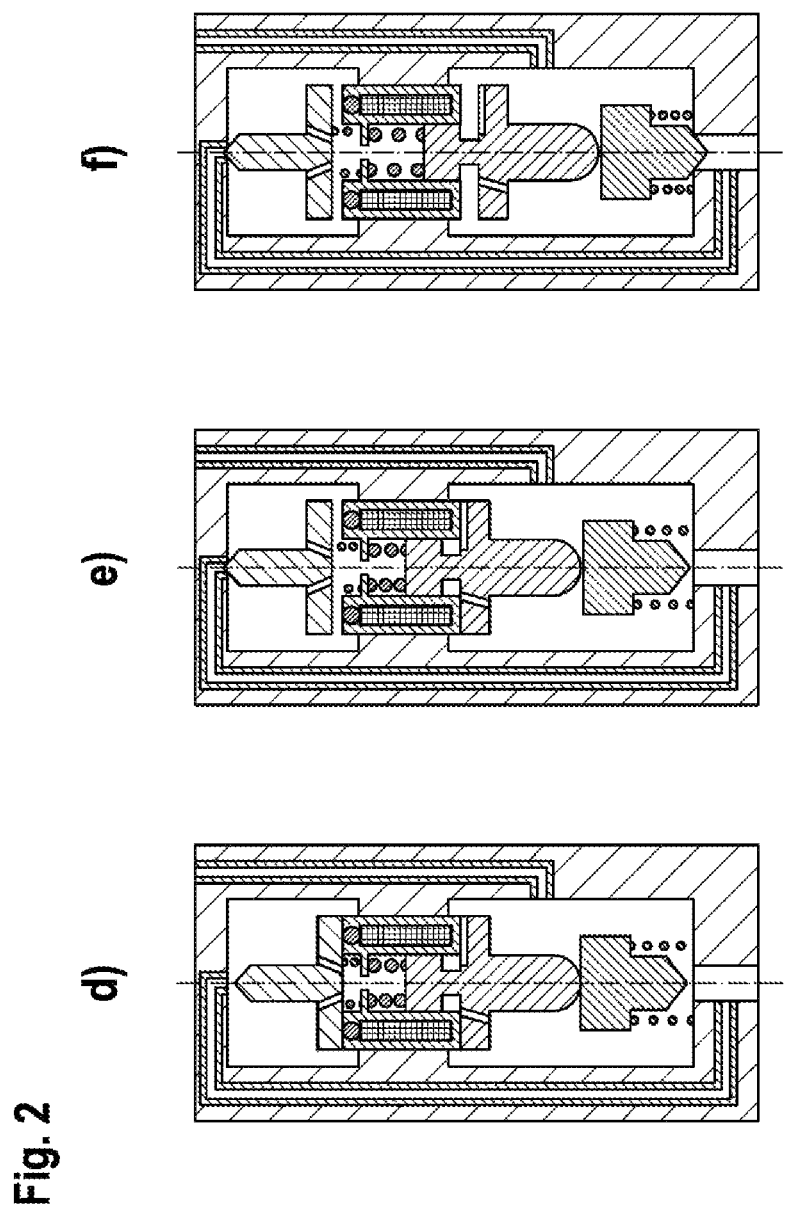

SOLENOID VALVE AND HYDROGEN TANK SYSTEM COMPRISING SOLENOID VALVE

BACKGROUND

The invention relates to a solenoid valve, in particular a shut-off valve for hydrogen tank systems. The invention further relates to a hydrogen tank system comprising a solenoid valve according to the invention in the form of a shut-off valve.

Solenoid actuators comprising plunger armatures are conventionally used for solenoid valves with large strokes, as is the case with, e.g., shut-off valves for hydrogen tank systems. Using the latter, the magnetic force decreases less with increasing distance between the armature and its fixed stop than with flat armature designs.

By way of example, DE 10 2018 221 602 A1 proceeds from a tank device for storing hydrogen comprising a valve device that can be actuated electromagnetically, which device comprises a movable valve element cooperating with a valve seat for opening and closing an outlet opening. The valve element is acted upon in the direction of the valve seat by the spring force of a spring, so the valve device is closed when the solenoid coil is not energized. In the open position, the valve element releases an outlet opening with a diameter as well as an outlet channel connected thereto. The valve element also forms a magnetic armature, which operates according to the plunger armature concept. When the solenoid coil is energized, a magnetic field enclosing the coil is formed, the field lines of which extend over an outer pole body, an inner pole body and the magnetic armature. The field lines run across a radial and an axial air gap between the magnetic armature and the outer pole body. With the help of the magnetic force generated in the axial air gap, the magnetic armature or the valve element can be lifted out of the sealing seat against the spring force of the spring, so that the solenoid valve opens.

In the case of a solenoid valve comprising a plunger armature, as described by way of example in DE 10 2018 221 602 A1, the field coupling via the radial air gap leading to a weakening of the magnetic field in the axial air gap. The result is a reduction in the magnetic force acting on the magnetic armature in the opening direction, meaning that a larger solenoid coil is required, which increases the installation space requirement.

SUMMARY

The present invention attempts to remedy this situation by providing a solenoid valve with an optimized field line routing. Also disclosed is a hydrogen tank system comprising a solenoid valve according to the invention.

The proposed solenoid valve, in particular shut-off valve for hydrogen tank systems, comprises a reciprocatingly movable magnetic armature that is coupled or can be coupled to a reciprocatingly movable valve element. The magnetic armature is preloaded in the direction of the valve element by means of a spring. The solenoid valve further comprises an annular solenoid coil for acting on the magnetic armature, the solenoid coil surrounding the magnetic armature in portions. According to the invention, the magnetic armature comprises a portion designed as a plunger armature and a portion designed as a flat armature, the portion designed as a plunger armature delimiting a pressure chamber inside the solenoid coil, which is pneumatically connected, preferably via a choke, to a control chamber, which can be relieved by opening a control valve that can also be actuated with the aid of the solenoid coil.

The surface of the magnetic armature delimiting the pressure chamber acts as a pressure surface, so that the pressure prevailing in the pressure chamber exerts a pneumatic force acting on the magnetic armature in the closing direction or in the direction of a sealing seat. The pressure surface is connected to the valve chamber on the opposite side, into which the magnetic armature protrudes. The pressure prevailing in the valve chamber thus causes a pneumatic force acting on the magnetic armature in the opening direction. If the pressure in the pressure chamber and the valve chamber are the same, the resulting force of the pair of forces on the opposing pressure surfaces is zero, i.e., they cancel each other out. The invention is based on the idea that the pressure in the pressure chamber can be lowered relative to the valve chamber.

In the proposed solenoid valve, therefore, not only the magnetic force generated by the solenoid coil acts on the magnetic armature, but also an opening pneumatic force that results from a pressure difference between the lowered pressure in the pressure chamber inside the solenoid coil and the pressure in the valve chamber. The pressure in the pressure chamber is lowered via the pressure reduction in the adjacent control chamber, which is pneumatically connected to the pressure chamber, the connection advantageously being designed in the form of a choke. The pressure reduction in the control chamber is in turn achieved by actuating a control valve, which is preferably connected for this purpose to a pressure system, in particular a line system, which is used to, e.g., supply a fuel cell or an internal combustion engine with fuel. The pneumatic separation from the valve chamber required for a pressure reduction in the pressure chamber can be achieved in this case via a correspondingly narrow routing of the magnetic armature, via sealing elements in the routing area and/or via diaphragm seals. In order for the main valve to close safely after the actuation and the associated closing of the control valve, it is necessary to enable backfilling of the pressure or control chamber. This can be achieved by a pneumatic connection between the valve chamber and the pressure chamber in the form of a choke bore, which is referred to as an inlet or Z choke. In one advantageous embodiment of the invention, when the routing of the magnetic armature is used for pneumatic separation, the routing itself can be designed as a Z choke.

Accordingly, the solenoid valve is designed as a servo-controlled solenoid valve, in which case the solenoid coil is not only used to actuate the control valve, but also acts on the magnetic armature of the main valve. The design of the magnetic armature as a plunger and flat armature is advantageous because, given the appropriate design of the magnetic circuit, the field lines can be directed more strongly via the flat armature portion, which comprises a larger magnetic interface than the plunger armature portion due to its larger diameter. For example, the solenoid coil can be designed in areas, in particular in an area facing the plunger armature portion, such that the latter comprises an increased magnetic resistance and, in extreme cases, even goes into saturation.

The design of the magnetic armature as a plunger and flat armature therefore enables optimization of the field line routing, in which the field lines of the magnetic circuit are predominantly guided through axial working air gaps. Doing so results in a high force acting on the magnetic armature of the main valve and—depending on the design of the control valve—as well as on its magnetic armature.

According to a preferred embodiment of the invention, the stroke of the magnetic armature is limited by a stroke stop. Accordingly, the magnetic armature executes defined stroke movements between two end positions. In particular, the portion of the magnetic armature designed as a flat armature can cooperate with the stroke stop so that no additional part connected to the magnetic armature in a frictional, interlocking, and/or bonded manner is required. The stroke stop itself can be formed by the solenoid coil or another component of the magnetic circuit, e.g., a pole body accommodating the solenoid coil.

Furthermore, the magnetic armature, in particular the portion of the magnetic armature designed as a plunger armature, is preferably guided via a sleeve. Routing over the plunger armature portion is particularly easy to implement. For example, the routing can be formed by a sleeve-shaped portion of a pole body receiving the solenoid coil. A separate sleeve can thus be omitted.

It is further proposed that the magnetic armature, in particular the portion of the magnetic armature designed as a plunger armature, and the sleeve together delimit at least one flow channel which connects the pressure chamber with a valve chamber in which the valve element is accommodated. In this case, the at least one flow channel serves as an inlet or Z choke. For secure connection of the flow channel or the Z choke, in particular in the event that the magnetic armature is in contact with the stroke stop, the magnetic armature and/or the sleeve can comprise at least one recess extending in the axial direction, e.g. a chamfer and/or a groove. Alternatively or additionally, the routing clearance can be increased in the area of the magnetic armature routing, which has the further advantage of making radial field coupling more difficult during energization of the solenoid coil.

In a further advantageous embodiment of the invention, a sealing element is provided between the magnetic armature and the sleeve, and the pressure chamber is connected via a flow channel to a valve chamber accommodating the valve element, which is formed as a bore, in particular a choke bore, in the magnetic armature or in the sleeve. In other words, the Z choke is not formed by the routing of the magnetic armature, but by a separate flow channel designed as a bore or choke hole.

The pneumatic connection between the pressure chamber and the valve chamber established via the at least one flow channel also ensures a connection of the valve chamber with the control chamber of the control valve, since the pressure chamber is connected to the control chamber-preferably via a choke. Therefore, in the closed position of the control valve, the same pressure prevails in all three chambers. Pneumatically connecting the chambers ensures safe closing of the control valve.

In the case of a stroke stop limiting the stroke of the magnetic armature, this is preferably designed to be non-sealing so as not to interrupt the pneumatic connection between the valve chamber and the pressure chamber. In an embodiment of the invention, it is therefore proposed that the magnetic armature, in particular the portion of the magnetic armature designed as a flat armature, and the stroke stop together delimit at least one flow channel that connects the valve chamber to the pressure chamber via the flow channel, which is preferably designed as a Z choke. The at least one further flow channel can be formed in particular as an essentially radially extending recess, in particular groove, in the magnetic armature and/or in the stroke stop.

Alternatively or additionally, it is proposed that the magnetic armature, in particular the portion of the magnetic armature designed as a flat armature, is penetrated by at least one flow-through opening. A pneumatic connection between the valve chamber and the pressure chamber can also be established via the at least one flow-through opening. The at least one flow- through opening can, e.g., be designed as a bore running axially or obliquely through the portion designed as a flat armature.

In an embodiment of the invention, it is proposed that the magnetic armature, in particular the portion of the magnetic armature designed as a plunger armature, comprises a circumferential cross-section reduction. In the area of the circumferential reduction in cross-section, the magnetic armature thus features a reduced outer diameter, so that the radial air gap between the magnetic armature and the routing increases in this area. Accordingly, the magnetic resistance in this area increases, which in turn leads to a reduction of the radial and amplification of the axial field lines. The reduction in cross-section can, e.g., be achieved by a twisted section in the plunger armature portion. Preferably, the cross-section reduction is located adjacent to the portion of the magnetic armature designed as a flat armature in order to guide the field lines more strongly across the axial working air gap.

Alternatively or additionally, it is proposed that the sleeve, preferably the sleeve-shaped portion of the pole body, comprises a circumferential portion made of a non-magnetic material. The non-magnetic material also leads to an increase in the radial air gap, so that this measure features a similar effect to the previously proposed reduction in the cross-section of the magnetic armature in the portion designed as a plunger armature.

Preferably, the circumferential portion made of a non-magnetic material is located at the level of the cross-section reduction of the magnetic armature at full stroke. In this case, the non-magnetic portion of the sleeve and the cross-section reduction of the magnetic armature act together as a field line switch. With the main valve still closed, the field line switch enables the field lines to couple radially into the magnetic armature, resulting-due to the very low magnetic resistance in the magnetic circuit-in a high force to open the control valve. When the main valve opens or is opened, the area of the cross-section reduction is brought into overlap with the non-magnetic portion of the sleeve, so that the radial self-coupling of the field lines is reduced or even completely prevented. This is because the field lines detach radially and swing around to the flat armature portion, since the magnetic resistance is lower here. The field line switch thus enables two working air gaps to be served by one solenoid coil without one air gap reducing the magnetic flux in the other air gap. In this way, very cost-effective solenoid valves can be manufactured that save energy and installation space.

The control valve of the proposed solenoid valve preferably comprises a magnetic armature designed at least in portions as a flat armature. The stroke of the control valve can thus be minimized. Accordingly, the air gap at the magnetic armature of the control valve is minimized, which has a favorable effect on the dimensioning of the solenoid coil. Advantageously, the magnetic armature of the control valve also forms a valve closing element cooperating with a sealing seat. The control valve can therefore be implemented in a comparatively simple and space-saving manner.

The magnetic armature of the control valve is preferably preloaded in the direction of the sealing seat by means of a control valve spring, meaning that the control valve comprises its own closing spring. The control valve spring can thus be designed independently of the main valve spring, in particular the spring force of the control valve spring can be selected to be smaller than the spring force of the main valve spring so that the control valve can be opened with reduced force. Doing so has a favorable effect on the dimensioning of the solenoid coil and thus on the installation space requirements of the solenoid valve. The solenoid coil need only be dimensioned large enough that the forces acting in the opening direction are greater than the sum of the pneumatic closing force at the control valve and the control valve spring force. In this way, not only a compact design is achieved, but at the same time the energy requirement of the solenoid valve is reduced.

Preferably, the magnetic armature of the control valve comprises at least one flow-through opening for connecting the pressure chamber to the control chamber. This applies in particular to a magnetic armature designed at least in portions as a flat armature. In particular, the at least one flow-through opening can open into a chamber upstream of the pressure chamber, which is connected to the pressure chamber via the choke. The choke ensures that there is a pressure drop in the control chamber when the control valve opens, since less gas flows in through the choke than escapes through the sealing seat of the control valve. At the same time, when the control valve is closed, the gas flowing in via the choke ensures the necessary closing and sealing force to keep the control valve closed.

Furthermore, it can be provided that the valve element of the main valve is preloaded in the direction of the magnetic armature by means of a valve element spring. The task of the valve element spring is to ensure that the main valve opens against the pressure in the valve chamber. The valve element spring makes it possible to very precisely set an opening pressure difference between the valve chamber and the line system when the main valve opens, effectively preventing high pressure surges in the system. As a result, safety devices for protecting downstream components, such as a pressure reducer and/or a medium pressure system, can be designed more simply and thus more cost-effectively. The spring force of the valve element spring is smaller than the spring force of the spring that preloads the magnetic armature in the direction of the valve element. Doing so ensures that the magnetic armature and the valve element are safely returned to their respective initial positions during closing.

The preferred field of application of a solenoid valve according to the invention are hydrogen tank systems, so that further a hydrogen tank system is proposed comprising at least one pressurized gas container and a solenoid valve according to the invention for shutting off the pressurized gas container. The hydrogen tank system can be used in particular in a fuel cell vehicle or in a vehicle with hydrogen combustion.

BRIEF DESCRIPTION OF THE DRAWINGS

Preferred embodiments of the invention and the advantages thereof are explained in greater detail hereinafter with reference to the accompanying drawings. Shown are.

DETAILED DESCRIPTION

Figure 1:
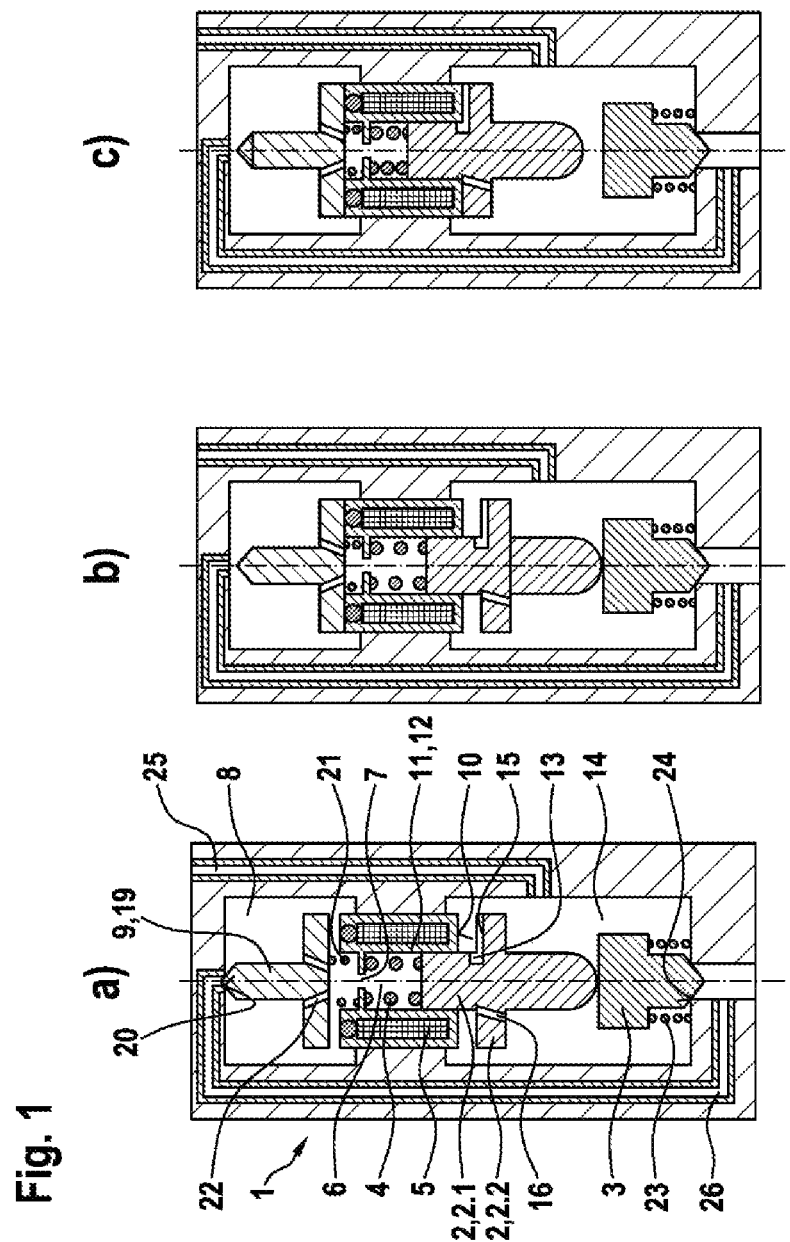
FIGS. 1 a)-f) each a schematic longitudinal section through a first solenoid valve according to the invention in different switching positions, FIGS. 2 a)-f) each a schematic longitudinal section through a second solenoid valve according to the invention in different switching positions, and FIGS. 3 a)-f) each show a schematic longitudinal section through a third solenoid valve according to the invention in different switching positions.

The solenoid valve 1 shown in FIGS. 1 a)-f) comprises an annular solenoid coil 5 housed in a pole body 12. The solenoid coil 5 can be used to generate a magnetic force which acts on a magnetic armature 19 of a control valve 9 on the one hand and on a magnetic armature 2 of the main valve on the other. The two magnetic armatures 2, 19 are arranged coaxially and move in opposite directions.

The magnetic armature 19 of the control valve 9 is designed at least in portions as a flat armature and is preloaded in the direction of a sealing seat 20 by means of a control valve spring 21. At the same time, the magnetic armature 19 forms a valve closing element cooperating with the sealing seat 20. Oblique flow-through openings 22 are designed in the portion of the magnetic armature 19 designed as a flat armature.

The magnetic armature 2 of the main valve comprises a first portion 2.1, which is designed as a plunger armature, and a second portion 2.2, which is designed as a flat armature. The magnetic armature 2 can be coupled to a valve element 3, which cooperates with a sealing seat 24. The magnetic armature 2 is preloaded in the direction of the valve element 3 via the spring force of a spring 4. The magnetic armature 2 is routed by means of a sleeve 11, which in this case is formed by a sleeve-shaped portion of a pole body 2 accommodating the solenoid coil 5.

Fig. 1a) shows the solenoid valve 1 with the solenoid coil 5 not energized and consequently in the closed state. High pressure prevails in the control chamber 8 as well as in a valve chamber 14, in which the valve element 3 of the main valve is accommodated, because a gas line 25, which preferably communicates with a storage volume of a pressurized gas container (not shown), opens into the valve chamber 14. The valve chamber 14 is in turn connected via the routing of the magnetic armature 2 to a pressure chamber 6, which is in communication with the control chamber 8 via a choke 7. Low pressure prevails outside the solenoid valve 1, i.e., in a gas line 26. In addition to the spring forces of the control valve spring 21 and the spring 4, pneumatic closing forces also act on the magnetic armature 19 and the valve element 3 of the main valve.

To open the solenoid valve 1, the control valve 9 is opened first. For this purpose, the solenoid coil 5 is energized so that a magnetic field is built up, the magnetic force of which lifts the magnetic armature 19 out of the sealing seat 20. The magnetic armature 19 comes into contact with the pole body 12 (see FIG. 1b)). The flow-through openings 22 formed in the magnetic armature 19 ensure that the control chamber 8 remains connected to the pressure chamber 6. As a result, not only the pressure in the control chamber 8 falls, but also the pressure in the pressure chamber 6. Supported by the magnetic forces generated by the solenoid coil 5, the forces acting on the magnetic armature 2 in the opening direction now predominate, so the armature moves in the direction of the solenoid coil 5 until it comes to rest against a stroke stop 10 (see FIG. 1c)). The volume displacement required for an opening movement of the magnetic armature is effected on the main valve side by an inflow from the pressurized gas container into the valve chamber 14 and on the control valve side by an outflow from the pressure chamber 6, preferably via a choke 7, into the control chamber 8 and from there via the open sealing seat 20 into the gas line 26. When a desired closing movement of the magnetic armature 2 occurs, however, the sealing seat 20 is closed by switching off the solenoid force, with the result that the volume displacement can no longer take place via the sealing seat 20 on the control valve side. In this case, the volume displacement on the control valve side is achieved by a corresponding pneumatic inflow via the pneumatic connection between the valve chamber 14 and the pressure chamber 6, which is designed as a Z choke. To ensure the connection, the magnetic armature 2 comprises flow channels 13, 15 as well as at least one flow-through opening 16, via which a pneumatic connection is established even when the magnetic armature 2 is in contact with the stroke stop 10.

The stroke of the magnetic armature 2 is thus effected with the aid of pneumatic and magnetic forces, whereby the special design of the magnetic armature 2, comprising a plunger armature portion 2.1 and a flat armature portion 2.2, not only leads to an amplification of the magnetic forces, but at the same time enables an optimization of the field line routing. In particular, the magnetic circuit can be designed such that the field lines increasingly pass over the flat armature portion 2.2. The radial field line coupling that weakens the magnetic field is minimized in this way. For example, the clearance in the area of the routing of the magnetic armature 2 can be increased so that the magnetic resistance in the radial air gap increases. Alternatively or complementarily, the magnetic resistance can be increased by changing the material.

During the stroke of the magnetic armature 2, it disengages from the valve element 3 so that the spring force of the spring 4 no longer exerts any influence on the valve element 3. Instead, a valve element spring 23 unfolds its action and lifts the valve element 3 out of the sealing seat 24 when the opening pressure difference between the gas line 26 and the valve chamber 14 is reached (see FIG. 1d)). The solenoid valve 1 is open.

In the open position of solenoid valve 1, pressure equalization occurs in gas lines 25 and 26 via valve chamber 14. When the pressure is fully equalized, the main valve and the control valve 9 are held open purely magnetically against the spring force of the springs 4, 21. Due to the minimal air gaps, this also succeeds with a lower "holding current" at the solenoid coil 5. Usually, a briefly higher current, which is referred to as the pickup current, is selected for opening. If the valve is then open, it is possible to switch from the pickup current to the lower holding current.

To close the solenoid valve 1, the current supply to the solenoid coil 5 is terminated so that the control valve spring 21 returns the magnetic armature 19 of the control valve 9 into the sealing seat 20 (see Fig. 1e)). When the control valve 9 is closed, the control chamber 8 fills with gas from the valve chamber 14 so that the pressure in the control chamber 8 increases again. The same applies to the pressure in pressure chamber 6, which is filled via the Z choke between valve chamber 14 and pressure chamber 6, so that the pressure in pressure chamber 6 also increases. Doing so causes the forces acting on the magnetic armature 2 in the closing direction to predominate and return the magnetic armature 2 to its initial position. The magnetic armature 2 comes into contact with the valve element 3 and presses it into the sealing seat 24 (see FIG. 1f)).

Further optimization of the field line routing can be achieved by further design measures. Preferred measures are described below with reference to FIGS. 2 and 3.

Figure 2:
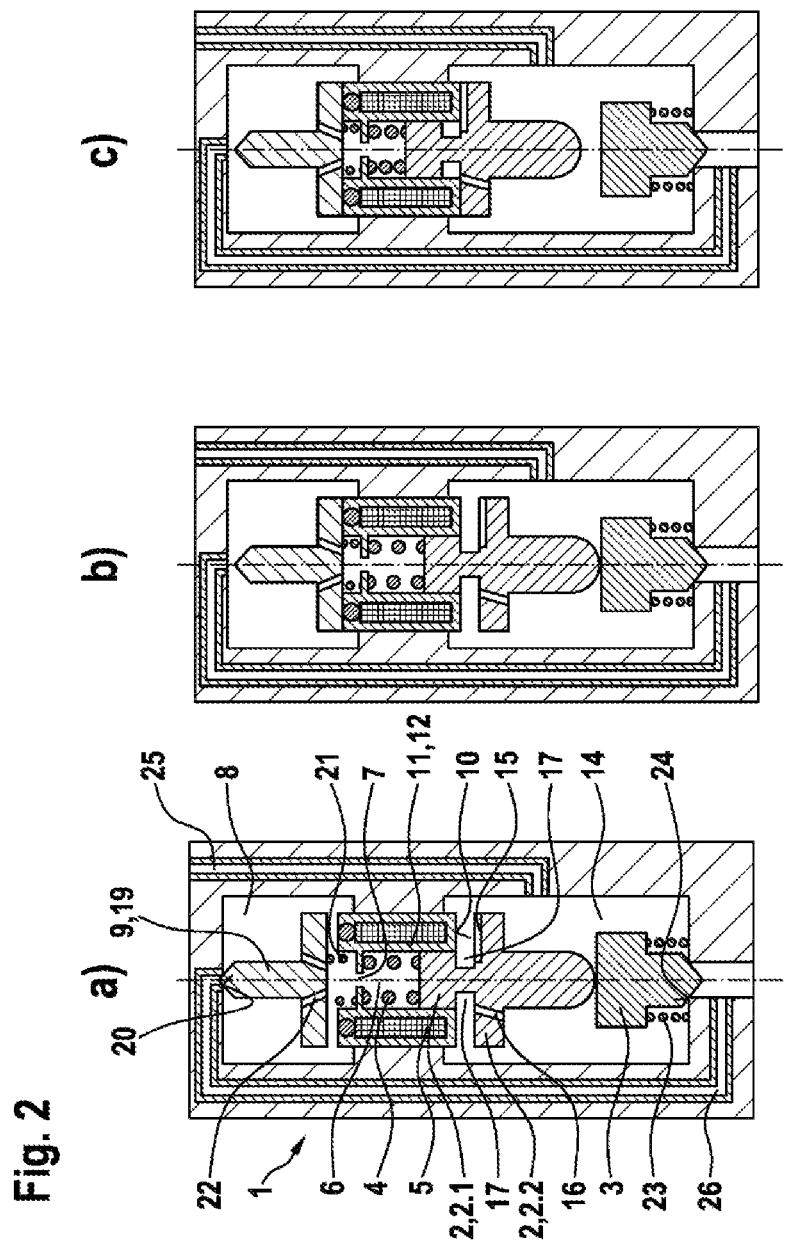

The solenoid valve 2 in FIGS. 2 a)-f) comprises a main valve with a modified magnetic armature 2. because, in the area of the portion 2.1, which is designed as a plunger armature, the magnetic armature 2 comprises a cross-section reduction 17. This contributes to the fact that the field lines of the magnetic field run more strongly through the portion 2.2, which is designed as a flat armature, since the radial air gap is increased in the area of the cross-section reduction 17 and thus the magnetic resistance is increased. The cross-section reduction 17 can be achieved in a simple manner by turning in at the magnetic armature 2. Preferably, the cross-section reduction 17 is arranged directly adjacent to the portion 2.2 designed as a flat armature, so that flow channels 15 and/or flow-through openings 16 formed in the flat armature portion 2.2 can open into this area to establish the necessary pneumatic connection of the valve chamber 14 with the pressure chamber 6.

The operation of the solenoid valve 1 in FIG. 2 corresponds to that of the solenoid valve 1 in FIG. 1. FIG. 2a) shows the solenoid valve 1 with the solenoid coil 5 not energized, i.e. in the closed state. For opening, the solenoid coil 5 is energized so that a magnetic field is built up, the magnetic force of which lifts the magnetic armature 19 of the control valve 9 out of the sealing seat 20 (see FIG. 2b)). When the control valve 9 is open, gas flows from the control chamber 8 into the gas line 26 so that the pressure in control chamber 8 drops. The same applies to the pressure in the pressure chamber 6, which is connected to the control chamber 8 via the choke 7. The pressure drop in the pressure chamber 6 leads to a relief of the magnetic armature 2 of the main valve so that the forces acting in the opening direction predominate and move the magnetic armature 2 in the direction of the solenoid coil 5 until the portion 2.2 designed as a flat armature comes into contact with the stroke stop 10 (see FIG. 2c)). As the magnetic armature 2 detaches from the valve element 3 in the process, the valve element spring 23 is able to lift the valve element 3 out of the sealing seat 24 as the gas line 26 is increasingly filled via the control valve 9 when the opening pressure differential is reached (see FIG. 2d)). In the event that the gas line 26 and the valve chamber 14 are pressure balanced prior to the start of energization, the valve element 3 is opened immediately when the control valve 9 is opened and the magnetic armature 2 is subsequently opened. The main valve is then also open. To close, the energization of the solenoid coil 5 is terminated so that the control valve spring 21 returns the magnetic armature 19 into the sealing seat 20 (see FIG. 2e)). When the control valve 9 is closed, the pressure in the control chamber 8 rises again, since it is pneumatically connected to the valve chamber 14. In the same way, the pressure in the pressure chamber 6 also increases via the Z choke, so that the forces acting on the magnetic armature 2 in the closing direction predominate and the latter moves in the direction of the sealing seat 24. In the process, the magnetic armature 2 comes into contact with the valve element 3 so that the magnetic armature 2 presses the valve element 3 into the sealing seat 24. The solenoid valve 1 is thus closed (see FIG. 2f)).

Figure 3:
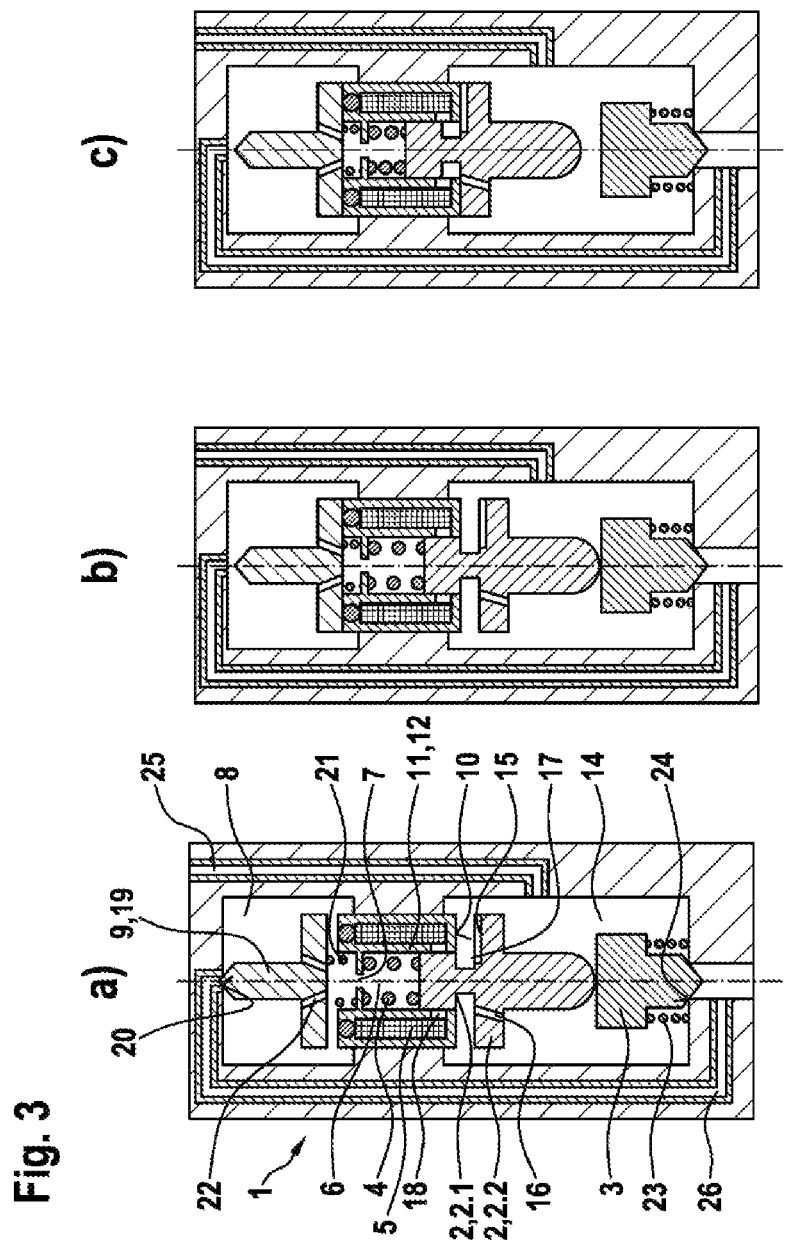
Figure 3:
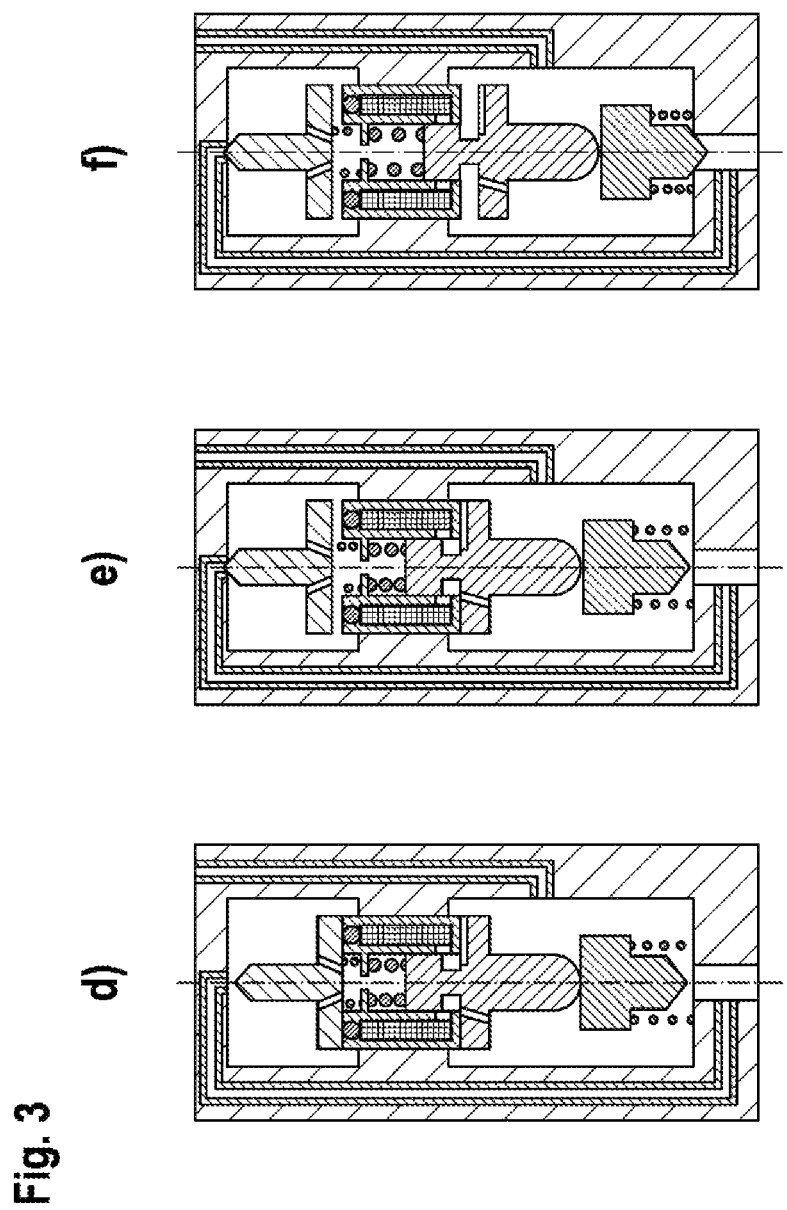

The solenoid valve 1 in FIG. 3 comprises, in addition to the reduction in the cross-section 17 of the magnetic armature 2, a sleeve 11 which serves to route the magnetic armature 2 and comprises a portion 18 made of a non-magnetic material in order to optimize the field line routing. The portion 18 interacts with the section reduction 17 to form a field line switch. The field line switch facilitates the operation of the control valve 9 and the main valve with only one solenoid coil 5. In particular, the magnetic flux in one air gap does not lead to a reduction of the magnetic flux in the respective other air gap, so that a particularly cost-effective as well as energy and installation space optimized solenoid valve 1 is provided in this manner.

Since in FIG. 3 the sleeve 11 is formed by a sleeve-shaped portion of the pole body 12, the latter comprises the portion 18 made of a non-magnetic material. Due to the use of a non-magnetic material, the portion 18 leads to an increase in the radial air gap, which is particularly evident as a field line switch when the stroke of the magnetic armature 2 brings the section reduction 17 into overlap with the portion 18 (see FIG. 3c)). Previously, i.e., when the main valve is closed (see FIG. 3a)), the field line switch couples field lines of the magnetic field via the radial air gap into the portion 2.1 of the magnetic armature 2, which is designed as a plunger armature. Since the magnetic resistance here is greater than in the area of the axial air gap between the magnetic armature 19 of the control valve 9 and the pole piece 12, there is a high magnetic force which can be used to open the control valve 9 (see FIG. 3b)). Only when the magnetic armature 2 of the main valve opens or is opened is the area of the cross-section reduction 17 brought into overlap with the portion 18 of the sleeve 11, so that radial coupling of the field lines is prevented or greatly reduced. The field lines thus detach radially and swing around to the flat armature portion 2.2 of the magnetic armature 2, which represents the lower magnetic resistance for the field lines. Since the magnetic armature 2 disengages from the valve element 3 during its stroke, the valve element is lifted out of the sealing seat 24 by the valve element spring 23 (see FIG. 3d)). In conclusion-as is similar to FIGS. 1 and 2-the current supply to the solenoid coil 5 is terminated so that first the control valve 9 (see FIG. 3e)) closes, and then the main valve (see FIG. 3f)).

The invention claimed is:

1. A solenoid valve (1) comprising: a reciprocatingly movable magnetic armature (2) which is or can be coupled to a reciprocatingly movable valve element (3), wherein the magnetic armature (2) is preloaded in a direction of the valve element (3) by a spring (4), the solenoid valve further comprising an annular solenoid coil (5) for acting on the magnetic armature (2), wherein the solenoid coil (5) surrounds the magnetic armature (2) in portions, wherein the magnetic armature (2) has a portion (2.1) configured as a plunger armature and a portion (2.2) configured as a flat armature, wherein the portion (2.1) configured as a plunger armature delimits a pressure chamber (6) within the solenoid coil (5), which pressure chamber is connected pneumatically to a control chamber (8) which can be relieved by opening a control valve (9) which can also be actuated by the solenoid coil (5).

2. The solenoid valve (1) according to claim 1, wherein a stroke of the magnetic armature (2) is limited by a stroke stop (10).

3. The solenoid valve (1) according to claim 2, wherein the portion (2.2) of the magnetic armature (2) configured as the flat armature is engagable with the stroke stop (10).

4. The solenoid valve (1) according to claim 1, wherein the magnetic armature (2) is guided over a sleeve (11) which is formed by a sleeve-shaped portion of a pole body (12) accommodating the solenoid coil (5).

5. The solenoid valve (1) according to claim 4, wherein the magnetic armature (2) and the sleeve (11) jointly delimit at least one flow channel (13) which connects the pressure chamber (6) to a valve chamber (14) in which the valve element (3) is accommodated.

6. The solenoid valve (1) according to claim 5, wherein the portion (2.2) of the magnetic armature (2) configured as a flat armature and a stroke stop (10) jointly delimit at least one flow channel (15) which connects the pressure chamber (6) to the valve chamber (14).

7. The solenoid valve (1) according to claim 4, wherein a sealing element is provided between the magnetic armature (2) and the sleeve (11), and the pressure chamber (6) is connected via a flow channel to a valve chamber (14) which accommodates the valve element (3) and is configured as a bore in the magnetic armature (2) or in the sleeve (11).

8. The solenoid valve (1) according to claim 7, wherein the portion (2.2) of the magnetic armature (2) configured as a flat armature, and a stroke stop (10) jointly delimit at least one flow channel (15) which connects the pressure chamber (6) to the valve chamber (14).

9. The solenoid valve (1) according to claim 4, wherein the sleeve (11) comprises a circumferential portion (18) made of a non-magnetic material, wherein the portion (18) is arranged at a level of a cross-section reduction (17) of the magnetic armature (2) when the magnetic armature (2) is in full stroke.

10. The solenoid valve (1) according to claim 1, wherein the portion (2.2) of the magnetic armature (2) configured as a flat armature is penetrated by at least one flow-through opening (16).

11. The solenoid valve (1) according to claim 1, wherein the portion (2.1) of the magnetic armature (2) configured as a plunger armature features a circumferential cross-section reduction (17) which is arranged adjacent to the portion (2.2) of the magnetic armature (2) configured as a flat armature.

12. The solenoid valve (1) according to claim 1, wherein the control valve (9) comprises a magnetic armature (19) which is configured at least in portions as a flat armature and also forms a valve closing element cooperating with a sealing seat (20).

13. The solenoid valve (1) according to claim 12, wherein the magnetic armature (19) of the control valve (9) is preloaded in a direction of the sealing seat (20) by a control valve spring (21).

14. The solenoid valve (1) according to claim 12, wherein the magnetic armature (19) of the control valve (9) comprises at least one flow-through opening (22) for connecting the pressure chamber (6) to the control chamber (8).

15. The solenoid valve (1) according to claim 1, wherein the valve element (3) is preloaded in a direction of the magnetic armature (2) by a valve element spring (23), wherein a spring force of the valve element spring (23) is smaller than a spring force of the spring (4) biasing the magnetic armature (2) in the direction of the valve element (3).

16. A hydrogen tank system comprising at least one pressurized gas container and solenoid valve (1) according to claim 1 for shutting off the pressurized gas container.

17. The solenoid valve (1) according to claim 1, wherein the solenoid valve (1) is a shut-off valve for hydrogen tank systems.

18. The solenoid valve (1) according to claim 1, wherein the pressure chamber is connected pneumatically to the control chamber (8) via a choke (7).

* * * * *